United States Patent [19]

Vogelsang et al.

[11] 3,872,838
[45] Mar. 25, 1975

[54] COMBUSTION ENGINE HAVING A ROTARY TYPE PISTON ARRANGEMENT

[75] Inventors: Gustav Vogelsang, Braunschweig; Helmut Leptien, Wolfsburg, both of Germany

[73] Assignee: Volkswagenwerk Aktiengesellschaft, Wolfsburg, Germany

[22] Filed: Aug. 8, 1973

[21] Appl. No.: 386,698

Related U.S. Application Data

[63] Continuation of Ser. No. 199,546, Nov. 17, 1971, abandoned.

[30] Foreign Application Priority Data

Nov. 30, 1971    Germany............................ 2058827

[52] U.S. Cl................................. 123/8.09, 418/61
[51] Int. Cl........................................... F02b 53/10
[58] Field of Search ............ 418/61; 123/8.09, 8.11, 123/8.13, 8.33, 8.35

[56] References Cited
UNITED STATES PATENTS 3,245,388   4/1966   Froede et al...................... 123/8.09
3,291,677   7/1968   Hett................................. 123/8.09
3,297,005   1/1967   Lamm.............................. 123/8.09
3,299,862   1/1967   Peras............................... 123/8.01
3,299,863   1/1967   Castelet........................... 123/8.01
3,606,602   9/1971   Hamada et al................... 123/8.09
3,610,209   10/1971  Hett................................. 123/8.09

Primary Examiner—C. J. Husar
Attorney, Agent, or Firm—Ernest F. Marmorek

[57]            ABSTRACT

In a combustion engine having a rotary-type piston arrangement therein mounted for rotation in a housing, gas guiding passages provided in said piston or housing, sealing means provided in said housing or in said piston, the gas guiding passages being elongated in shape transversely with respect to the direction of movement of the piston and having at least one bearing surface formed for the sealing means, the bearing surface being directed in the direction of movement of the piston.

10 Claims, 7 Drawing Figures 3,872,838

INVENTORS:
Gustav Vogelsang,
BY Helmut Leptien,

Their Attorney 3,872,838

COMBUSTION ENGINE HAVING A ROTARY TYPE PISTON ARRANGEMENT

This is a continuation, of application Ser. No. 199,546, filed Nov. 17, 1971, and now abandoned.

FIELD OF THE INVENTION

The present invention relates to a combustion engine having a housing and rotary piston arrangement, especially a circular-type rotary piston arrangement arranged for rotation and in which gas supply channels are provided transverse to the direction of rotation of the piston in the piston itself or in the housing and wherein in the housing or in the piston sealing strips are provided.

BACKGROUND OF THE INVENTION

In the case of circular type rotary piston arrangements the profile of which are defined by an epitrochoide and which have 2N lobes and are mounted for rotation eccentrically in a housing having 2N+1 lobes and the outer surface of which is defined by the envelope of a similar function, in the event that the gas passages are provided in the piston, there are too large overlappings present. It has been, therefore, attempted in such engines to keep the gas control openings as small as possible. In order to have, however, sufficiently large cross sections for such openings, the control openings are arranged transversely with respect to the direction of movement in the piston. As a result, however, there is the danger present that the sealing strips which, in this case, are provided in the housing, when swept over by the gas passages, become bent and even break off.

In order to prevent breakage of the piston rings, in connection with exhaust passages in two-cycle engines, abutting surfaces which pass completely through the passages became known, such surfaces however when used in connection with the exhaust passages become subject to very high temperature differences and thereby become subject to very large temperature gradients so that the formation of cracks represented a constant danger.

SUMMARY OF THE INVENTION

It is an object of the present invention to construct a gas guiding passage which can be inlet or outlet passages in such a manner that the above mentioned disadvantages become eliminated in combustion engines having rotary piston arrangements especially circular type-piston arrangements.

According to the present invention the gas guiding channels or passages are provided with at least one abutting or bearing surface for the sealing strips, such abutting surface lying in the direction of movement of the piston.

According to another feature of the present invention the gas guiding passages are provided on each longitudinal side with at least one abutting surface in such a manner that oppositely lying abutting surfaces are offset with respect to each other and have an overlap in the longitudinal direction. As a result, the gas guiding passages have a meander-shape. In order to prevent the formation of cracks due to temperature gradients, the transition portions of the abutting surfaces and the longitudinal sides of the gas guiding passages are formed with a certain radius of curvature. Such rounding off of the transition points has certain advantages also from the view point of flow techniques.

BRIEF DESCRIPTION OF THE DRAWING

The invention will become more readily apparent from the following description of preferred embodiments thereof shown in the accompanying drawing, in which.

DESCRIPTION OF THE PREFERRED EMBODIMENTS

Figure 1:
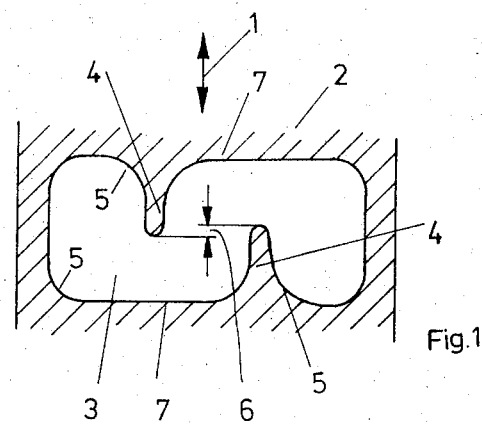
FIG. 1 is a schematic representation of a gasguiding passage formed on the piston or on the housing in a rotary-type piston engine, the particular piston or housing portion being illustrated in partial section; and along the line in I—I in FIG. 4.
Figure 2:
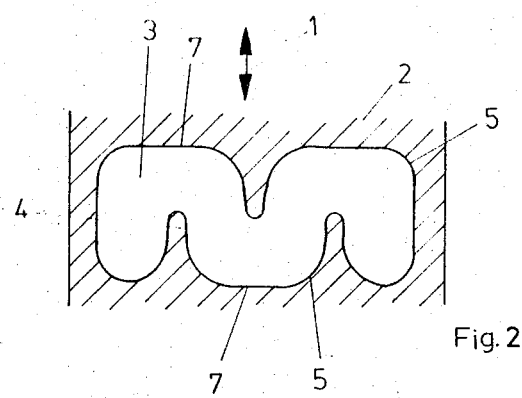
FIG. 2 is a view similar to FIG. 1 illustrating another embodiment of the gas guiding passage of the present invention, in similar view as in FIG. 1.

With reference to FIGS. 1 and 2 illustrating two preferred embodiments of the present invention the member identified by the reference numeral 2 and which can be either the piston or the housing rotates in the direction identified by the arrow 1. In a specific embodiment of a so-called Ka-engine the shape of which is defined by a epitrochoide and, more particularly, by the envelope thereof, the gas guiding passages are provided in the piston, therefore, the reference numeral 2 in such a case identifies the piston. However, in another embodiment of an engine to which the present invention just as well applicable, such as the NSU - Wankel systems, the reference numeral 2 will identify the housing. The gas-guiding passage 3 has a meander-shape and its regions of transition to the bearing surfaces 4 and at its corners is provided with a radius of curvature 5. The bearing surfaces 4 are formed as long and in such a size that there is an overlapping 6 between them so that they are capable of providing a reliable continuous abutting for the sealing strip not shown in the drawing.

Figure 3:
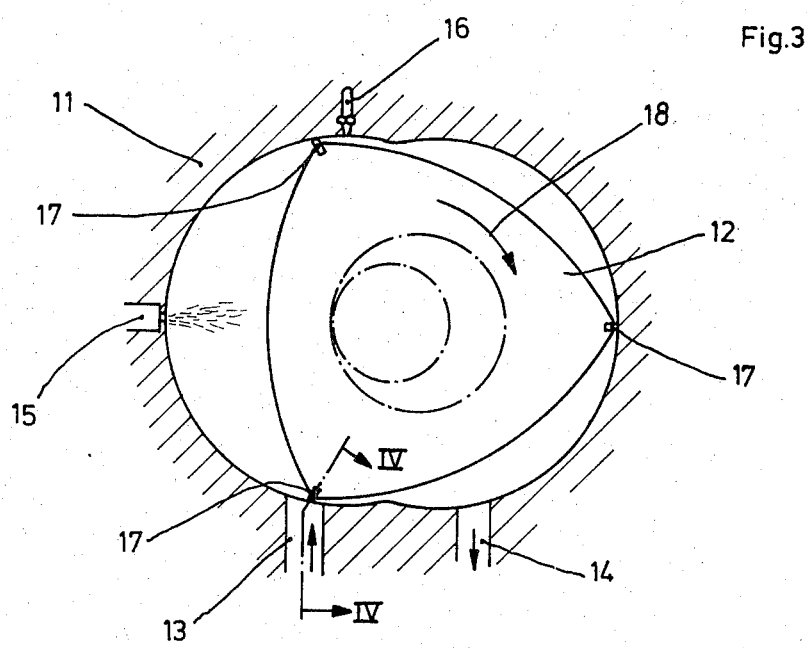
FIG. 3 illustrates in section a rotary-type combustion engine known as the Wankel-engine, the inner housing surface of which in cross-section consists of a two-lobe epitrochoid while the piston, which forms the inner envelope curve, is provided with three corners.

With reference to FIG. 3 illustrating in cross-section and in a schematic fashion a well-known Wankel engine in which in a housing 11 a triangularly shaped piston 12 rotates on an eccentric support and which during its relative movement with respect to the housing 11 in the direction of the arrow 18 it is sliding contact by means of its corners with the inner surface of the housing. This sliding contact can be described as a slipping engagement which is characteristic of the Wankel engine and which became known as the Si-engine due to the German language initials of the words slipping engagement and inner envelope curve. There are, however, other types of rotary piston engines with camming engagement and outer envelope curve. That engine which is also known as Ka-engine is also the subject matter of U.S. Pat. No. 3,452,723 of J. Keylwert issued July 1, 1969 and assigned to Klocker-Humboldt-Deutz A.G., Cologne-Deutz, Germany. In the Ka-engine the sealing means is carried by the housing instead of by the piston as in the Wankel engine which is illustrated here.

In the housing a gas input channel 13 and an exhaust gas channel 14 are provided along with an injection nozzle 15 and a sparkplug 16. At the three corners of the piston 12 sealing means 17 are mounted which by means of spring means 19 are forced in engagement with the inner surface of the housing during the sliding movement of the piston 12, thereby provide a gas-tight separation between the operating chambers formed by the three curved sides of the piston 12 and by the contour of the housing 11.

Figure 4:
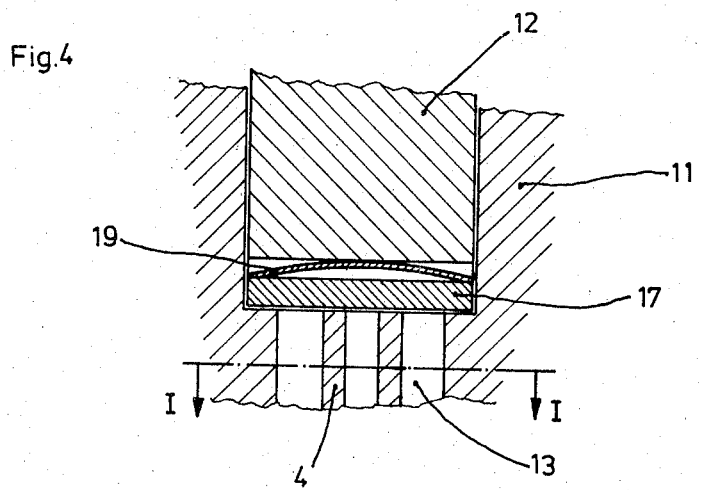
FIG. 4 is a sectional view taken along line IV—IV in FIG. 3 illustrating the formation of the gas-inlet opening according to the present invention.

As can be seen in FIG. 4 the sealing strip means extend over the entire width of the piston 12. When the sealing strip means 17 sweeps over the gas input channel 13 and gas output channel 14 they come in contact with the wall of the housing 11 only at their end portions while over their major extent they lie over the channel 13 or 14 which are elongated in shape as shown in FIGS. 1 and 2.

In order to avoid arching, bending and thereby breaking of the sealing strip means as mentioned already above, abutting or supporting surfaces are created by the very formation of the channels 13 and 14, such formation resembling the winding of a river at sharp turns and in analogy the land enclosed between adjacent turns of the river is what becomes the abutting or supporting surface 4 here.

In the case of gas passages which are exposed to less thermal loads one may use bearing surfaces which completely pass through the passage, however, in such a case the efficiency is substantially reduced.

Figure 5:
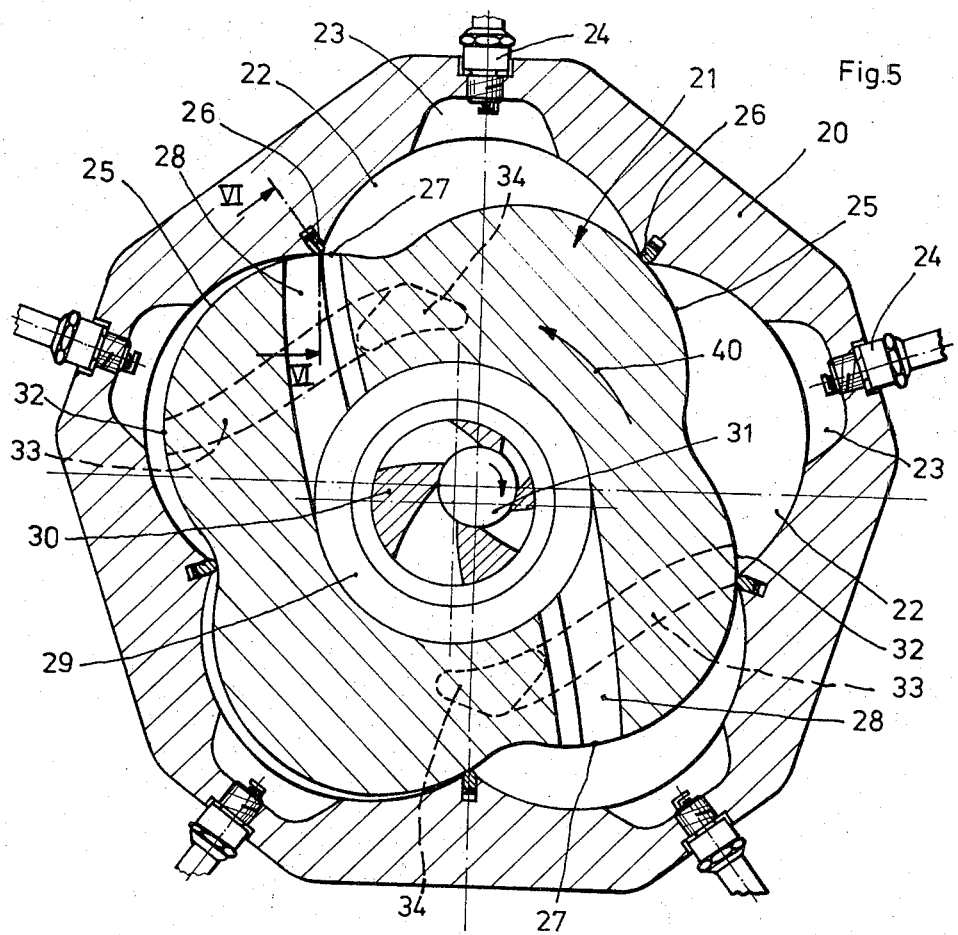
FIG. 5 illustrates in a cross-section view a rotary-type combustion engine.

With reference to FIG. 5 illustrating in cross-section a rotary-type combustion engine, the reference numeral 20 identified the middle portion of the housing shell which surrounds the piston 21. The outer profile of the piston 21 defines an epitrochoid curve and, in the illustrated embodiment, is provided with four arch-like lobes 25, the inner contour of the middle housing portion 20, on the other hand, has a profile which corresponds to the outer envelope curve of the epitrochoid-shaped contour of the piston 21 and is provided with five arch-shaped recesses 22. During the rotation of the piston 21 about an eccenter member 30 as the journal means between the piston 21 and the middle housing member 20, five operating spaces are formed having variable volume as the piston rotates and having an outer boundary defined by the arch-like recesses 22. The individual operating spaces are always coupled with a combustion space 23 into which a sparkplug 24 protrudes.

Figure 6:
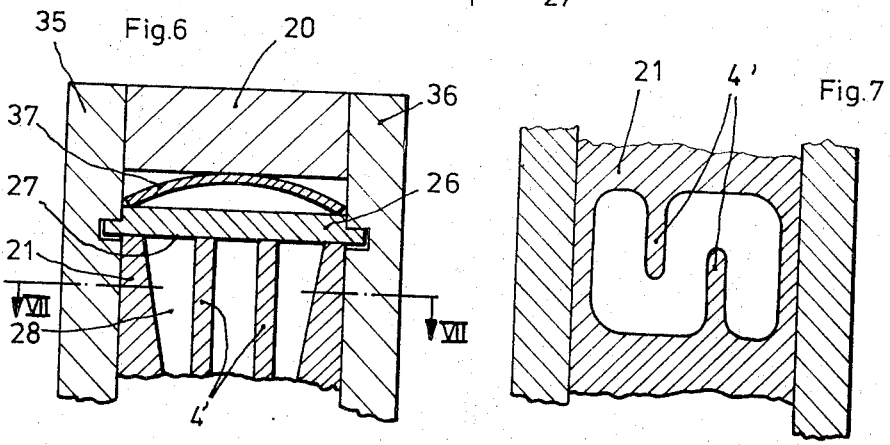
FIG. 6 is a sectional view taken along VI—VI in FIG. 5.

In order to seal the individual operating spaces with respect to each other at the corners of the housing shell 20, sealing strips 26 are provided which, as can be seen in FIG. 6, ectend over the entire axial length of the piston 21 and, by means of a spring 37, are biased into contact with the outer contour of the piston 21.

The supplying and removing of the fuel mixture, respectively, the exhaust gases, into and from the operating spaces is performed over the slots 27 and 32 arranged over the circumference of the piston 21 which are communicating with gas guiding channels 28 and 33. For example, the supply of the operating gases over the channel 28 is performed through an annular space 29 provided in the inner of the piston 21 which in turn is coupled with a central gas supply bore 31 provided in the eccenter shaft 30 of the piston arrangement. In the rotary-type piston arrangement illustrated herein and having the four arched lobes for its piston 21, two of the lobes are provided with gas supply slots 27 and always in the frontal region of the piston lobe 25 when viewed in the direction of rotation as indicated by the arrow 40. On the same piston lobe 25, however, in the back region when viewed in the direction of rotation on the piston 21, there is provided a gas exit aperture 34 provided in the end surface of the disc-shaped piston 21. Such gas exit opening is in communication with a ring-shaped exhaust gas conduit, which is not shown here, provided in a side member of the engine housing, such as side member 36, and which, through an exhaust conduit is open to the atmosphere. The details of operation of the above structurally described combustion engine can be more closely followed in application having Ser. No. 190,196 of Peter Hofbauer et al, assigned to the assignee of the present application.

With reference to FIG. 6, illustrating the side members 35 and 36 of the engine housing, it is noted that they can be connected with the middle portion of the housing 20 by means of bolt connections. For the sake of simplicity, FIG. 6 or the previous FIG. 5, does not illustrate the cooling channels between the housing or in the pistons.

Figure 7:
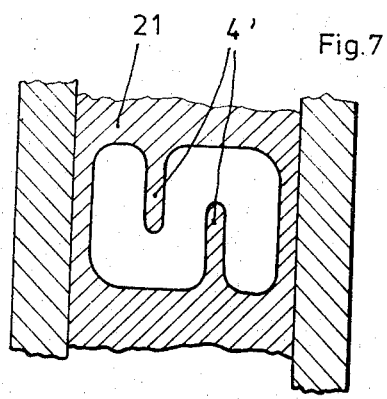
FIG. 7 is a sectional view taken along line VII—VII in FIG. 6.

As can be seen in FIGS. 6 and 7, the gas supplying channels 28 and 33 are provided with so-called run-up or bearing surfaces 4' which, when the gas or gas removing slots 27 or 32 pass over the sealing strips 26, will present at least one, however, as can be seen in the illustrated embodiment, two run-up or bearing surfaces for the sealing strip 26. As a result, the sealing strip 26 will not be bent when the channels 27 or 32 are passing under it, which is the primary object of the present invention, namely, to prevent bending or breaking of the sealing strips 26 which otherwise would occur if the slots 27 or 32 would be simply formed as a rectangular slot without the benefit of the run-up or bearing surfaces 4 and 4'.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a combustion engine having a rotary-type piston arrangement therein mounted for rotation in a housing, gas guiding passages provided in said piston, sealing means provided in said housing, said gas guiding passages being elongated in shape transversely with respect to the direction of movement of said piston, each of said gas guiding passages having at least one bearing surface associated therewith for said sealing means, said bearing surface being elongated in the direction of movement of said piston.

2. The combination as claimed in claim 1, wherein said gas guiding passage has at least a pair of longitudinal sides, each of said longitudinal sides being provided with at least one bearing surface.

3. The combination as claimed in claim 2, wherein said bearing surfaces lie opposite and spaced with respect to each other and have an overlapping in length in the longitudinal direction thereof.

4. The combination as claimed in claim 2, wherein said bearing surfaces lie parallel with respect to each other and extend in a common direction.

5. The combination as claimed in claim 1, wherein said bearing surfaces have transition regions with the associated gas passage, said transition regions are formed with a predetermined radius of curvature.

6. In a combustion engine having a rotary-type piston arrangement therein mounted for rotation in a housing, gas guiding passages provided in said housing, sealing means provided in said piston, said gas guiding passages being elongated in shape transversely with respect to the direction of movement of said piston, said gas guiding passages having at least one bearing surface associated therewith for said sealing means, said bearing surface being elongated in the direction of movement of said piston.

7. The combination as claimed in claim 6, wherein said gas guiding passage has at least a pair of longitudinal sides, each of said longitudinal sides being provided with at least one bearing surface.

8. The combination as claimed in claim 7, wherein said bearing surfaces lie opposite and spaced with respect to each other and have an overlapping in length in the longitudinal direction thereof.

9. The combination as claimed in claim 7, wherein said bearing surfaces lie parallel with respect to each other and extend in a common direction.

10. The combination as claimed in claim 6, wherein said bearing surfaces have transition regions with the associated gas passage, said transition regions are formed with a predetermined radius of curvature.

* * * * *